United States Patent Office 2,983,583
Patented May 9, 1961

2,983,583
METHOD OF PREPARING BORON TRICHLORIDE FROM BORIC OXIDE AND SILICON TETRACHLORIDE

William H. Schechter, Bradford Woods, Pa., assignor to Callery Chemical Company, Pittsburgh, Pa., a corporation of Pennsylvania No Drawing. Filed Mar. 28, 1958, Ser. No. 725,471

2 Claims. (Cl. 23—205)

This invention relates to the preparation of boron trichloride and more particularly to the preparation of boron trichloride from boric oxide and non-metallic chlorides.

Boron trichloride, $BCl_3$, is used in several processes to prepare other boron compounds, as a catalyst, and, in general, is regarded as a basic boron compound. Therefore, although several methods of preparing it are known, there is continuing interest in the boron chemical industry directed toward the finding of new and improved preparative methods.

It is an object of this invention to provide a new method of preparing boron trichloride from boric oxide and certain non-metallic liquid chlorides.

Other objects will become apparent from the following specification and claims.

This invention is based upon the discovery that boric oxide will react at elevated temperatures with certain non-metallic chlorides to produce boron trichloride. The chlorides which have been found to react with boric oxide in this manner include carbon tetrachloride, silicon tetrachloride, phosphorus trichloride, and sulfur monochloride. Although the reaction mechanism in each instance is not fully understood, the primary reactions are believed to correspond to the following equations:

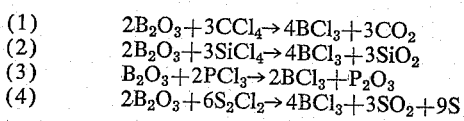

(1) $2B_2O_3 + 3CCl_4 \rightarrow 4BCl_3 + 3CO_2$
(2) $2B_2O_3 + 3SiCl_4 \rightarrow 4BCl_3 + 3SiO_2$
(3) $B_2O_3 + 2PCl_3 \rightarrow 2BCl_3 + P_2O_3$
(4) $2B_2O_3 + 6S_2Cl_2 \rightarrow 4BCl_3 + 3SO_2 + 9S$ The reaction in each case takes place upon contacting the reactants at elevated temperatures. The temperatures which may be used depend to some extent upon the particular chloride used, and further, upon the method used to carry out the reaction, i.e., static system, flow system, or other. In general, however, temperatures of from about 600° C. to 1000° C. may be used.

The following examples illustrate the invention described herein.

*Example I.*—An Alundum boat containing 5.29 millimoles of $B_2O_3$ was placed in one end of Vycor tube, which was then placed in a furnace heated to 700° C. 9.85 millimoles of $CCl_4$ was allowed to reflux over the heated boric oxide for 15 minutes. The volatile portions of the reaction mixture were then distilled out of the tube and analyzed. Substantial amounts of boron trichloride were identified in the reaction products by infrared absorption analysis. The overall reaction appears to be more complex than is indicated by Equation 1 above, since in addition to carbon dioxide, some carbon monoxide and phosgene were found among the products, along with unreacted carbon tetrachloride.

*Example II.*—A tube containing 9.57 millimoles of $B_2O_3$ was charged with 7.93 millimoles of $SiCl_4$. The lower portion of the tube, containing the $B_2O_3$, was maintained at 800° C. for 15 minutes, whereupon the $SiCl_4$ continually vaporized, condensed on the cooler portion of the tube and drained into the hot zone. Most of the silicon tetrachloride was recovered unchanged. 0.43 millimole of $BCl_3$ were obtained. Based on the $SiCl_4$ consumed, the yield of boron trichloride was about 70% based on Equation 2.

*Example III.*—In another experiment, conducted in a manner similar to those above, 10.0 millimoles of $S_2Cl_2$ was heated with 5.04 millimoles of $B_2O_3$ at 800° C. for 10 minutes. Boron trichloride and sulfur dioxide were obtained in the volatile products, and a yellow solid, believed to be sulfur, formed in the tube.

*Example IV.*—9.32 millimoles of $PCl_3$ were passed over excess $B_2O_3$ heated to 800° C. for 10 minutes. The volatile products formed were analyzed with an infrared spectrometer and found to be predominantly $BCl_3$. Some orange colored solids also formed in the reactor during the reaction.

The non-metallic chlorides which have been found useful in the practice of this invention are all volatile liquids at ordinary temperatures, and their reaction with molten boric oxide may be carried out in any manner or apparatus suitable for effecting high-temperature reactions. In the laboratory, it has been found convenient to carry out the reactions in sealed tubes on a batch basis, as described in connection with the examples given above. In larger scale applications, it may be desirable to use other methods, such as stirred pots, flow systems, or fluidized bed techniques wherein the chloride is entrained on an inert gas carrier. Similarly, inert solvents or dispersion media may be used if desired.

The boron trichloride which is formed in the foregoing reactions is often obtained as a mixture with unreacted chloride, as well as with other volatile products in some instances. The boron trichloride may be separated and recovered by fractional condensation, selective absorption, gas chromatography, or any other method which may ordinarily be used to separate such mixtures.

According to the provisions of the patent statutes, I have explained the principle and mode of practicing my invention, have described what I now consider to be its best embodiments. However, I desire to have it understood that within the scope of the appended claims, the invention may be practiced otherwise than as specifically described.

I claim:
1. A method of preparing boron trichloride, $BCl_3$, which comprises contacting boric oxide, $B_2O_3$, with silicon tetrachloride, $SiCl_4$, while maintaining said boric oxide at a temperature from about 600° C. to about 1000° C., and recovering the boron trichloride formed.

2. A method according to claim 1 in which the temperature is about 800° C.

References Cited in the file of this patent
UNITED STATES PATENTS

| | | |
|---|---|---|
| 2,097,482 | Weber | Nov. 2, 1937 |
| 2,369,212 | Cooper | Feb. 13, 1945 |
| 2,369,214 | Cooper | Feb. 13, 1945 |
| 2,446,221 | Ferguson | Aug. 3, 1948 |
| 2,770,526 | Lander | Nov. 13, 1956 |

OTHER REFERENCES

Mellor: "Comprehensive Treatise on Inorganic and Theoretical Chemistry," vol. 8, pp. 1011 and 1016, 1928; vol. 5, 1924, p. 130.

Weber: "Uber das Bortrichlorid," pp. 10 and 11, 1934.

Friend: Textbook of Inorganic Chemistry (1926), Charles Griffin and Co., Ltd., London, vol. 5, pages 95, 96, 195 and 196; vol. 6, part 2, page 93; vol. 7, part 2, page 79.